W. N. LONG.
VALVE.
APPLICATION FILED JAN. 14, 1909.

942,576.

Patented Dec. 7, 1909.

WITNESSES
J. A. Brophy
W. Harrison

INVENTOR
William N. Long
BY
ATTORNEYS

UNITED STATES PATENT OFFICE.

WILLIAM N. LONG, OF EUGENE, OREGON.

VALVE.

942,576.

Specification of Letters Patent.

Patented Dec. 7, 1909.

Application filed January 14, 1909. Serial No. 472,194.

*To all whom it may concern:*

Be it known that I, WILLIAM N. LONG, a citizen of the United States, and a resident of Eugene, in the county of Lane and State of Oregon, have invented a new and Improved Valve, of which the following is a full, clear, and exact description.

My invention relates to valves of the kind used in connection with flushing tanks.
A more particular purpose of my improvement is to produce a valve having a cup movable in relation to an inlet pipe, this cup being provided with a hood for preventing excessive splashing of the water when the cup is raised for the purpose of allowing water, under considerable pressure, to refill the tank. In this connection it may be stated that flushing tanks are frequently refilled by water at excessively high pressure, ranging from 50 to 150 pounds per square inch. It is not always desirable to diminish this pressure, for the reason that it must be maintained for considerations independently of the operation of the tank. When, however, water is forced into the tank under such excessive pressure, the result is apt to be an undue splashing of water in the tank, and in many instances a spray of the liquid is thrown over the top of the tank, to the annoyance of people in the immediate vicinity. I find that the trouble just mentioned is due mainly to the fact that in the type of valve ordinarily used there is a cup which covers and uncovers a nozzle, and that, in order to avoid the trouble, it is necessary to prevent water from escaping upwardly around the cup as the latter is raised.

Reference is to be had to the accompanying drawings forming a part of this specification, in which similar characters of reference indicate corresponding parts in both the figures.

Figure 1:
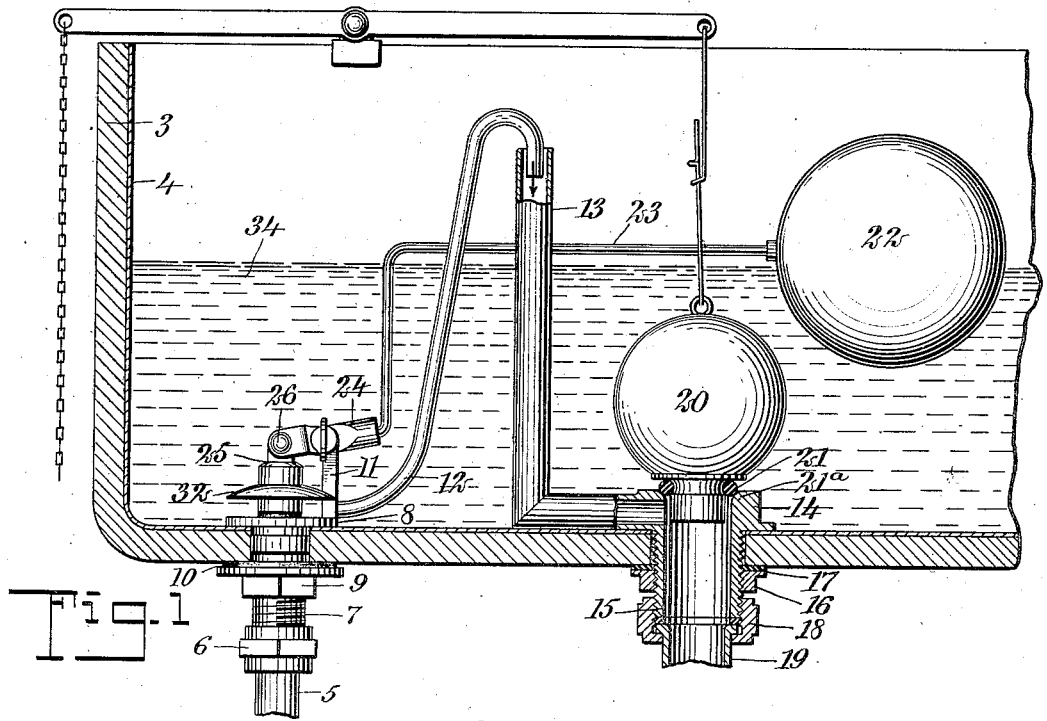
Figure 2:
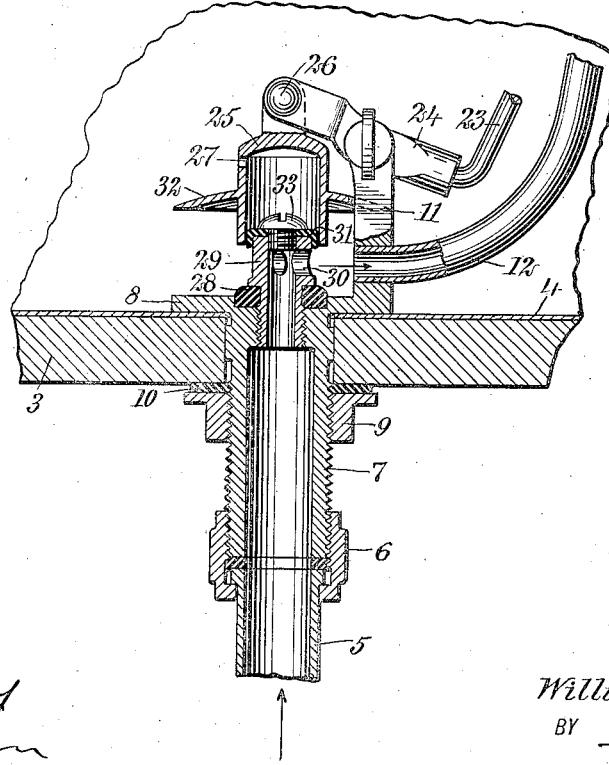

Figure 1 is a substantially central vertical section through a flushing tank equipped with by improved valve and parts associated therewith; and Fig. 2 is a fragmentary vertical section, on an enlarged scale, showing the details of the inlet valve.

A tank is shown at 3 and is provided internally with a lining 4 which may be of metal. At 5 is an inlet pipe and at 6 is a union. A tubular sleeve 7 is connected to the pipe 5 by aid of this union and is threaded externally. This tubular sleeve 7 terminates at its upper end in a plate 8. Revolubly mounted upon the tubular sleeve is a threaded nut 9 which engages a gasket 10 in such manner as to force the same against the under side of the tank. A post 11 integral with the plate 8 extends upwardly from the latter. A pipe 12 extends through the post 11 and upwardly therefrom into the top of the overflow pipe 13. This pipe is connected with a plate 14 having a threaded tubular portion 15 extending therebelow through the bottom of the tank. A threaded nut 16 is mounted upon the tubular extension 15 and engages a gasket 17 which is thus forced against the under side of the tank. A cap 18 having a general annular form is threaded internally and fitted upon the lower end of the threaded tubular member 15. This cap 18 forms a union between the tubular member 15 and the outlet pipe 19.

At 20 is shown a ball valve which is provided with an annular gasket 21, and this gasket rests upon an annular seat 21ª and so controls the flow of water from the tank.

At 22 is a float and connected with the same is an arm 23, this arm being provided with an enlarged portion 24, the latter being pivoted on the post 11 and connected by a pivot 26 with a cup 25, provided with a hole 27. A hood 32, integral with the cup 25, has a considerably greater diameter than the cup, and serves as a shield for preventing the splashing of water, as hereinafter described. This hood has substantially the form of a segment of a sphere.

Mounted upon the plate 8 and partially sunken thereinto is a rubber gasket 28. A sleeve 29 threaded at its bottom, extends through the gasket 28 and is in communication with the outlet pipe 5 through the medium of the threaded sleeve 7. The sleeve 29 is provided with openings 30, one of which is in alinement with the lower end of the pipe 12. A gasket 31 of rubber is mounted upon the upper end of the sleeve 29 and is held by aid of a screw 33. The opening 30 being substantially in alinement with the pipe 12 enables the water, when discharged from the openings 30 into the tank, to find its way, to some extent, upwardly through the pipe 12, thereby causing a small discharge of water to take place below the ball valve 20 whenever the tank is refilled. The water in the tank is shown at 34.

The operation of my device is as follows: Whenever the ball valve 20 is raised in the usual manner, the water flows freely from the tank out through the pipe 19. The lowering of the water allows the float 22 to descend and this raises the cup 25 so as to uncover the holes 30. The water now passing through the inlet pipe 5 is discharged through the holes 30 and a portion of this water finds its way upward through the pipe 12 and downward through the pipe 13 and into the outlet pipe 19. Each time the cup 25 is raised so as to uncover the holes 30, the water escaping in various directions from these holes tends to splash and to even leave the tank. The hood 32 prevents this and confines the outflow of the water within a predetermined zone.

Having thus described my invention, I claim as new and desire to secure by Letters Patent:

The combination of a receptacle, a nozzle extending thereinto for discharging a liquid, said nozzle being provided with a hole, a cup movable relatively to said nozzle for the purpose of opening and closing said hole, said cup being provided with an air vent and being further provided with a shield encircling said cup and disposed at the approximate center of said cup intermediate the top and bottom thereof, for the purpose of preventing excessive splashing of water.

In testimony whereof I have signed my name to this specification in the presence of two subscribing witnesses.

WILLIAM N. LONG.

Witnesses:
  ALICE F. SWIFT,
  FLORA W. LIVERMORE.